(12) United States Patent
Blair et al.

(10) Patent No.: US 8,433,124 B2
(45) Date of Patent: *Apr. 30, 2013

(54) SYSTEMS AND METHODS FOR DETECTING AN OPTICALLY VARIABLE MATERIAL

(75) Inventors: Ronald Bruce Blair, Flower Mound, TX (US); Alexander Parkov, Plano, TX (US)

(73) Assignee: De La Rue North America Inc., Irving, TX (US)

( * ) Notice: Subject to any disclaimer, the term of this patent is extended or adjusted under 35 U.S.C. 154(b) by 190 days.

This patent is subject to a terminal disclaimer.

(21) Appl. No.: 12/984,476

(22) Filed: Jan. 4, 2011

(65) Prior Publication Data

US 2011/0164805 A1    Jul. 7, 2011

Related U.S. Application Data

(63) Continuation-in-part of application No. 12/683,932, filed on Jan. 7, 2010.

(51) Int. Cl.
*G06K 9/00* (2006.01)
*G06F 17/00* (2006.01)

(52) U.S. Cl.
USPC .......................... 382/135; 382/274; 235/379

(58) Field of Classification Search .................. 382/100, 382/106, 108, 112–115, 135–141, 162, 168, 382/173, 181, 191, 193–194, 199, 209, 219, 382/232, 254, 274, 276, 290–292, 305, 312; 235/379; 358/474
See application file for complete search history.

(56) References Cited

U.S. PATENT DOCUMENTS

| | | | |
|---|---|---|---|
| 4,650,319 A | 3/1987 | Stenzel et al. | |
| 5,498,879 A | 3/1996 | De Man | |
| 6,111,261 A | 8/2000 | Bolza-Schunemann et al. | |
| 6,249,591 B1 * | 6/2001 | Tullis | 382/106 |

(Continued)

FOREIGN PATENT DOCUMENTS

| EP | 1250682 B1 | 8/2005 |
|---|---|---|
| JP | 10-116369 | 5/1998 |

(Continued)

OTHER PUBLICATIONS

U.S. Appl. No. 12/683,932; Final Office Action dated Sep. 19, 2012; First Named Inventor: Ronald Bruce Blair.

(Continued)

*Primary Examiner* — Seyed Azarian
(74) *Attorney, Agent, or Firm* — Patton Boggs LLP

(57) ABSTRACT

Systems and methods for detecting an optically variable material are provided. According to an illustrative embodiment, a method for detecting an optically variable material includes capturing a first image of at least a portion of a document while the at least a portion of the document is subjected to a first electromagnetic radiation from a first angle of incidence, and capturing a second image of at least a portion of the document while the at least a portion of the document is subjected to a second electromagnetic radiation from a second angle of incidence. The first angle of incidence is different from the second angle of incidence. The first and second images are captured by an imaging device that has substantially fixed position. The method also includes comparing the first image to the second image to determine whether an optically variable material is present on the document.

20 Claims, 14 Drawing Sheets

U.S. PATENT DOCUMENTS

| | | | |
|---|---|---|---|
| 6,256,407 B1 | 7/2001 | Mennie et al. | |
| 6,347,163 B2 | 2/2002 | Roustaei | |
| 6,766,045 B2 * | 7/2004 | Slepyan et al. | 382/135 |
| 6,839,128 B2 | 1/2005 | Premjeyanth et al. | |
| 6,913,260 B2 | 7/2005 | Maier et al. | |
| 6,937,322 B2 | 8/2005 | Gerz et al. | |
| 6,962,247 B2 | 11/2005 | Maier et al. | |
| 6,970,235 B2 | 11/2005 | Christophersen | |
| 7,218,386 B2 | 5/2007 | Alcock et al. | |
| 7,372,990 B2 | 5/2008 | Yamauchi et al. | |
| 7,583,846 B2 | 9/2009 | Yamauchi et al. | |
| 7,599,544 B2 * | 10/2009 | Moshe | 382/141 |
| 7,657,112 B2 | 2/2010 | Kuwabara | |
| 7,715,613 B2 * | 5/2010 | Dobbs et al. | 382/135 |
| 7,737,417 B2 | 6/2010 | Giering et al. | |
| 7,864,381 B2 | 1/2011 | Scott | |
| 7,978,899 B2 | 7/2011 | Jenrick et al. | |
| 8,004,725 B2 * | 8/2011 | Schnitzlein | 358/474 |
| 8,225,989 B1 * | 7/2012 | Turocy et al. | 235/379 |
| 2003/0030785 A1 | 2/2003 | Christophersen | |
| 2003/0174878 A1 | 9/2003 | Levin | |
| 2006/0115139 A1 | 6/2006 | Joshi et al. | |
| 2006/0159329 A1 | 7/2006 | Joshi et al. | |
| 2007/0216976 A1 | 9/2007 | Endo et al. | |
| 2008/0054545 A1 | 3/2008 | Calverley et al. | |
| 2008/0116628 A1 | 5/2008 | Edwards et al. | |
| 2010/0128964 A1 | 5/2010 | Blair | |
| 2010/0128965 A1 | 5/2010 | Blair | |

FOREIGN PATENT DOCUMENTS

| | | |
|---|---|---|
| JP | 2003-272022 | 9/2003 |
| JP | 2006053736 A | 2/2006 |
| KR | 1020010090049 | 10/2001 |
| KR | 1020080094426 | 10/2008 |

OTHER PUBLICATIONS

U.S. Appl. No. 13/539,155; Notice of Allowance dated Aug. 31, 2012; First Named Inventor: Ronald Bruce Blair.

U.S. Appl. No. 12/872,960; Election/Restriction Requirement dated Oct. 3, 2012; First Named Inventor: Alexander Parkov.

U.S. Appl. No. 12/872,960, Parkov et al.

PCT/US2009/063146 Written Opinion of the International Searching Authority; Mailed Jun. 22, 2010; Applicant: De La Rue North America, Inc.

PCT/US2010/047485 Written Opinion of the International Searching Authority; Mailed May 30, 2011; Applicant: De La Rue North America, Inc.

U.S. Appl. No. 12/277,936; Non-Final Office Action dated Jul. 20, 2011; First Named Inventor: Ronald Bruce Blair.

U.S. Appl. No. 12/277,936; Final Office Action dated Dec. 20, 2011; First Named Inventor: Ronald Bruce Blair.

U.S. Appl. No. 12/323,109; Notice of Allowance dated Dec. 1, 2011; First Named Inventor: Ronald Bruce Blair.

PCT/US2009/063148 Written Opinion of the International Searching Authority; Mailed Jun. 22, 2010; Applicant: De La Rue North America, Inc.

U.S. Appl. No. 12/277,936; Non-Final Office Action dated May 22, 2012; First Named Inventor: Ronald Bruce Blair.

U.S. Appl. No. 12/323,109; Notice of Allowance dated Mar. 21, 2012; First Named Inventor: Ronald Bruce Blair.

U.S. Appl. No. 12/683,932; Non-Final Office Action dated May 22, 2012; First Named Inventor: Ronald Bruce Blair.

* cited by examiner

| Line | Red | Green | Blue | IR |
|---|---|---|---|---|
| 1 | 255 | 0 | 0 | 0 |
| 2 | 0 | 255 | 0 | 0 |
| 3 | 0 | 0 | 255 | 0 |
| 4 | 0 | 0 | 0 | 255 |
| 5 | 255 | 255 | 255 | 0 |

700

|  | Azimuth 1 | | | Azimuth 2 | | |
|---|---|---|---|---|---|---|
| Line | Red | Green | Blue | Red | Green | Blue |
| 1 | 255 | 0 | 0 | 0 | 0 | 0 |
| 2 | 0 | 0 | 0 | 255 | 0 | 0 |
| 3 | 0 | 255 | 0 | 0 | 0 | 0 |
| 4 | 0 | 0 | 0 | 0 | 255 | 0 |
| 5 | 0 | 0 | 255 | 0 | 0 | 0 |
| 6 | 0 | 0 | 0 | 0 | 0 | 255 |

SYSTEMS AND METHODS FOR DETECTING AN OPTICALLY VARIABLE MATERIAL

CROSS-REFERENCE TO RELATED APPLICATION

This application is a continuation-in-part application of U.S. patent application Ser. No. 12/683,932, filed Jan. 7, 2010, which is hereby incorporated by reference.

TECHNICAL FIELD

The present invention relates generally to detecting an optically variable material, and more particularly, to detecting an optically variable material on a document.

BACKGROUND

Physical documents, such as banknotes (e.g., paper money), checks, legal-related documents, and other document types, play a useful role in today's society, including in the areas of communication and the economy. At times, documents may include one or more physical features that facilitate one or more purposes, such as document authentication, identification, aesthetics, integrity, etc. One example of such a physical feature is optically variable material (including an optically variable device), which may possess the ability to change color, brightness, position, or other attributes depending upon the position of either or both of an observer or light source. Current systems may fail to adequately and efficiently detect the presence of optically variable materials on documents.

SUMMARY

According to an illustrative embodiment, a method for detecting an optically variable material includes capturing a first image of at least a portion of a document while the at least a portion of the document is subjected to a first electromagnetic radiation from a first angle of incidence, and capturing a second image of at least a portion of the document while the at least a portion of the document is subjected to a second electromagnetic radiation from a second angle of incidence. The first angle of incidence is different from the second angle of incidence. The first and second images are captured by an imaging device that has a fixed or substantially fixed position. The method also includes comparing the first image to the second image determine whether an optically variable material is present on the document.

According to another illustrative embodiment, a method includes capturing a first plurality of line images of a document. Each of the first plurality of line images is captured while at least a portion of the document is subjected one or more frequencies of electromagnetic radiation from a first angle of incidence. The method includes capturing a second plurality of line images of the document. Each of the second plurality of line images is captured while at least a portion of the document is subjected one or more frequencies of electromagnetic radiation from a second angle of incidence. The first angle of incidence is different from the second angle of incidence. The method also includes determining a first color value for at least a portion of the document using the first plurality of line images, determining a second color value for at least a portion of the document using the second plurality of line images, determining whether the first color value differs from the second color value, and determining that an optically variable material is present on the document in response to the first color value differing from the second color value.

According to another illustrative embodiment, an apparatus for detecting an optically variable material includes a first electromagnetic radiation source to emit a first electromagnetic radiation toward a document at first angle of incidence, and a second electromagnetic radiation source to emit a second electromagnetic radiation toward the document at a second angle of incidence. The first angle of incidence is different from the second angle of incidence. The apparatus also includes an imaging device to capture a first image and a second image of the document. Each of the first image and the second image is captured while electromagnetic radiation from at least one of the first electromagnetic radiation source or the second electromagnetic radiation source emitted toward the document. The apparatus also includes a controller to determine whether an optically variable material is present on the document based on a difference between the first image and the second image.

BRIEF DESCRIPTION OF THE DRAWINGS

The novel features believed characteristic of the invention are set forth in the appended claims. The invention itself, however, as well as the preferred mode of use further objectives and advantages thereof, will be best understood by reference the following detailed description of illustrative embodiments when read in conjunction with the accompanying drawings, wherein:

DETAILED DESCRIPTION

In the following detailed description of the illustrative embodiments, reference is made to accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Figure 1:
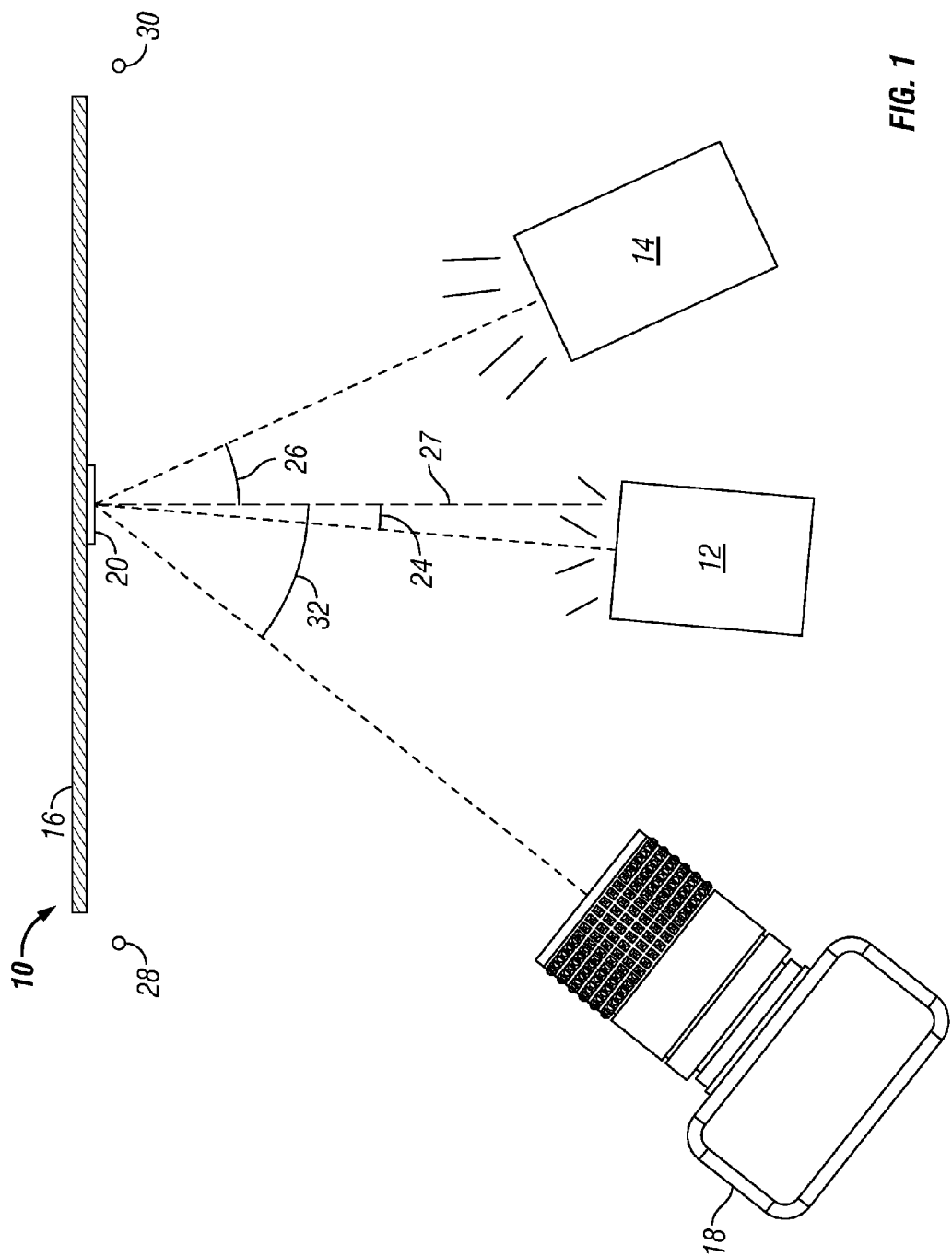
FIG. 1 is a schematic, pictorial representation of an optically variable material detection system according to an illustrative embodiment.
Figure 2:
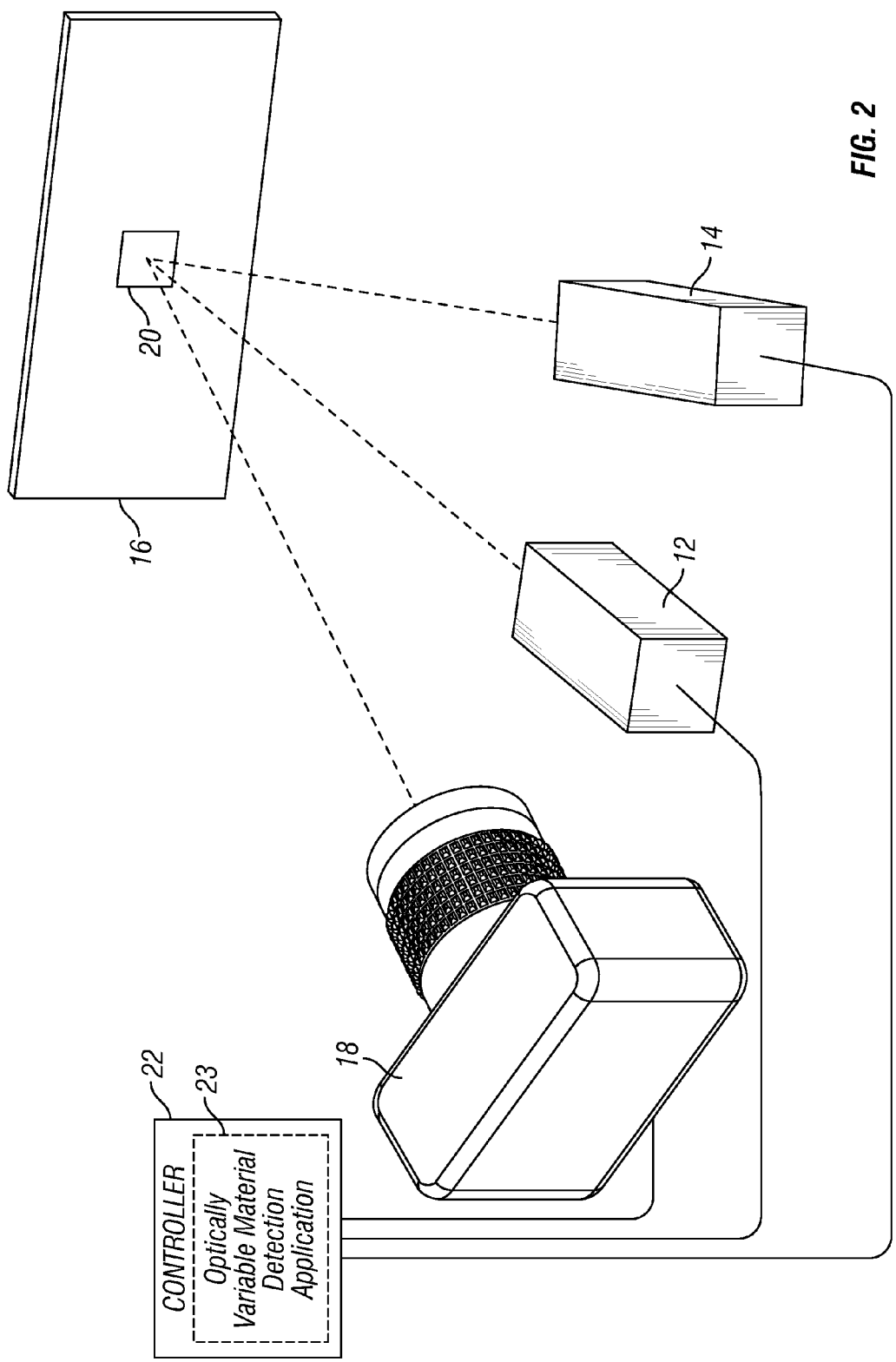
FIG. 2 is a schematic, perspective view of the optically variable material detection system shown in FIG. 1.

Referring to FIGS. 1 and 2, an illustrative embodiment of an optically variable material detection system 10 includes a first electromagnetic radiation source 12, such as a light source, and a second electromagnetic radiation source 14. Either or both of the first and second electromagnetic radiation sources 12, 14 may emit any frequency of electromagnetic radiation, including light, towards a document 16, either simultaneously or non simultaneously, while an imaging device 18 captures two or more images of all or a portion of the document 16. Unless otherwise indicated, as used herein, "or" does not require mutual exclusivity. The two or more images captured by the imaging device 18 may then be compared to one another by a controller, or processor, 22 to determine whether an optically variable material 20 is present on the document 16. In one embodiment, if one of the images captured by the imaging device 18 differs, either in whole or in part, from another of the images captured by the imaging device 18, the controller 22 may determine that the optically variable material 20 is present on the document 16. Any combination of the processes described herein may be performed by an optically variable material detection application 23, which may be implemented on the controller 22.

Each of the electromagnetic radiation sources 12, may emit electromagnetic radiation towards all or a portion of the document 16 at a particular angle of incidence 24, 26 or azimuth. In one embodiment, the angles of incidence 24, 26 at which each of the electromagnetic radiation sources 12, 14 are positioned relative to the document 16 may differ. For ease of reference, a line 27 that is normal, or perpendicular, to the document 16 is shown. In the non-limiting example of FIG. 1, the angle of incidence 24 at which the first electromagnetic radiation source 12 emits electromagnetic radiation towards the document 16 is approximately −10 degrees, and the angle of incidence 26 at which the second electromagnetic radiation source 14 emits electromagnetic radiation towards document 16 is approximately degrees. However, an electromagnetic radiation source used in the optically variable material detection system 10 may have any angle of incidence between and 90 degrees, the positions of which are shown, by way of illustration, by the markers 28 and 30, respectively.

While FIGS. 1 and 2 show the optically variable material detection system 10 to include two electromagnetic radiation sources 12 and 14, any number of electromagnetic radiation sources may be utilized in the system 10 (e.g., one, three, five, etc.). Also, each of the electromagnetic radiation sources 12 and 14 may be capable of emitting one or more different frequencies or wavelengths of light (e.g., white, red, green, blue, UV, IR, gamma, microwave, radio, etc.). In one illustrative embodiment, each of electromagnetic radiation sources 12 and 14 may be capable of emitting red, green, or blue light, either simultaneously or non-simultaneously and in any combination. Also, the specific technique or components used to emit light from the electromagnetic radiation sources 12 and 14 may vary, and may include light-emitting diodes (LEDs), light bulbs, lasers, chemical-based emission, combustion-based emission, electron stimulated emission, electroluminescent (EL) lamps, etc.

In one embodiment, the imaging device 18 may be a camera or photodetector. Non-limiting examples of the type of camera that may be used as the imaging device 18 include a line scan camera, a TDI camera, a frame camera, an x-ray imaging device, etc. In one embodiment, the optically variable material detection system 10 may include a single imaging device 18 or camera that is located at a fixed or substantially fixed, as opposed to movable, position. Also, the imaging device 18 may be positioned at an angle of incidence 32 that differs from the angles of incidence 24 and 26 of the first an second electromagnetic radiation sources 12 and 14. However, in another embodiment, the angle of incidence 32 at which the imaging device 18 captures all or a portion of the document 16 may be the same or similar as either or both of the first or second electromagnetic radiation sources 12 or 14. In embodiment, the angle of incidence 32 of the imaging device may range anywhere from −90 to 90 degrees, which are represented by the markers 28 and 30, respectively.

In another non-limiting embodiment, the optically variable material detection system 10 may include two or more, instead of one, camera. The two or more cameras may each be positioned at different angles of incidence, and, may, in one example, perform line-synchronized or frame-synchronized capture of the document 16. Also, in one embodiment, the two or more cameras may used in conjunction with a single light source (e.g., one of the first or second electromagnetic radiation sources 12 or 14) so that, if an optically variable material is present on the document 16, the respective images captured by each camera will, differ from one another due to their differing angles of incidence.

The optically variable material detection system may be used to detect any type of optically variable material 20, including any material or device capable of changing color, brightness, position, or other attribute(s) depending upon the position of either or both of an observer or electromagnetic radiation source, or upon the emission of an electromagnetic radiation source. For example, the optically variable material detection system 10 may be used to detect a hologram or optically variable device (OVD), including e.g., laser-generated hologram images and electron beam generated images. Other non-limiting examples of optically variable devices that may be detectable by the optically variable material detection system 10 include 2D/3D images, 3D images, dot matrix images, filmed stereogram images, combination images, ebeam images, etc. Another example of an optically variable material that may be detectable by the optically variable material detection system 10 is color shifting elements (CSE) such as optically variable ink (OVI), color shifting foils, and other color shifting materials. CSEs may produce different reflective colors (e.g., magenta and green) at different angles of incidence and reflection. CSEs may be used in different contexts, including as security features on major currencies and similar documents. Non-limiting examples of a CSE is provided below in FIGS. 5A and 5B.

The document 16 may be any type of document on which an optically variable material may be present, including, but not limited to, financial documents (e.g., checks, money orders, travelers checks, banknotes, etc.), legal-related documents, artwork, or any other type of document. The document 16 may also be formed from any material, such as paper, polymer, metal, etc. The document 16 may be stationary or in motion when the imaging device 18 captures images of an or a portion of the document 16.

In one illustrative embodiment, the imaging device 18 may capture the first image of all or a portion of the document 16 while that portion of the document 16 is subjected to, or eliminated by, electromagnetic radiation from the first electromagnetic radiation source 12. The imaging device 18 may also capture a second image of all or a portion of the document 16 while the portion of the document 16 is subjected to electromagnetic radiation from 2nd electromagnetic radiation source 14. The portion of the document 16 captured by the imaging device 18 in the first and second images may be the same or different. Also, while the imaging device 18 captures the first and second images, the imaging device 18 may be in a substantially fixed position. The frequency of electromagnetic radiation emitted by the first electromagnetic radiation source 12 may be the same or different than the frequency of electromagnetic radiation emitted by the second electromagnetic radiation source 14. In one embodiment, while the imaging device 18 captures the first or second images, either or both of the first and second electromagnetic radiation sources 12, 14 may subject the document 16 to two or more frequencies of light, and these frequencies of light may be emitted simultaneously or non-simultaneously. For example, the first electromagnetic radiation source 12 may switch between emitting UV and white light toward the document 16 and the imaging device captures an image of the document 16. In another example, the two or more frequencies emitted by the first and second electromagnetic radiation sources 12 or 14 may include red (e.g., a frequency in a range of 400-484 Terahertz or a wavelength in a range of 620-750 nanometers), green (e.g., a frequency in a range of 526-606 Terahertz or a wavelength in a range of 495-570 nanometers), or blue (e.g., a frequency in a range of 631-668 Terahertz or a wavelength in a range of 450-475 nanometers), or any combination of two or more thereof. In another embodiment, each of the first and second electromagnetic radiation sources 12 and 14 may emit white light toward the document 16 when the imaging device 18 captures the first, second, or any additional images.

Once the imaging device 18 captures the first, second, or any additional images, the controller 22 may compare the first image to the second image to determine whether optically variable material 20 is present on the document 16. In comparing the first image to the second image, the controller 22 may determine whether any differences exist between the first and second images, and determine that an optically variable material 20 is present on the document 16 if a difference does exist between the first and second image.

In one embodiment, after the imaging device 18 captures the first and second images, the controller 22 may determine a first color value and a second color value for at least a portion of the first and second images, respectively. The first and second color values may be any value that describes a color characteristic of either or both images, such as, for example, hue value or red/green ratio. The controller 22 may then, in the comparison process described above, determine whether the first color value differs from the second color value. If the first color value differs from a second color value, the controller 22 may determine that an optically variable material 20 is present on the document 16.

The controller 22 may determine a color value for all or a portion of an image of the document 16. For example, if it is predetermined that the document 16 may contain an optically variable material 20 on a certain targeted area of the document 16, the controller 22 may determine a first and second color value for a portion of the first and second images, respectively, corresponding to the targeted area of the document 16. The controller 22 may then compare the first and second color values associated with the targeted area of the document 16 to determine whether the targeted area includes an optically variable material 20.

In another embodiment, including in those contexts in which a hologram may appear on the document 16, after the imaging device 18 captures the first and second images, the controller 22 may compare the first and second images by determining whether a position of any feature in the first and second images has changed, or otherwise differs. In particular, the position of certain visual elements within optically variable devices, such as holograms, may change based on the perspective of either or both of electromagnetic radiation sources 12, 14 or the imaging device 18. By determining whether such a visual element differs between the first and second images captured by the imaging device 18, the controller 22 may determine whether an optically variable material such a hologram is present on the document 16.

In another embodiment, the imaging device 18 may be a line scan camera, and may capture the first and second images by capturing first and second pluralities of line images that respectively form the first and second images. The first and second pluralities of line images may be arranged in a predetermined sequence, and may form an interleaved image of the document 16 that includes both the first and second image. Non-limiting embodiments in which line images and interleaved images are utilized is described in further detail below.

Figure 3:
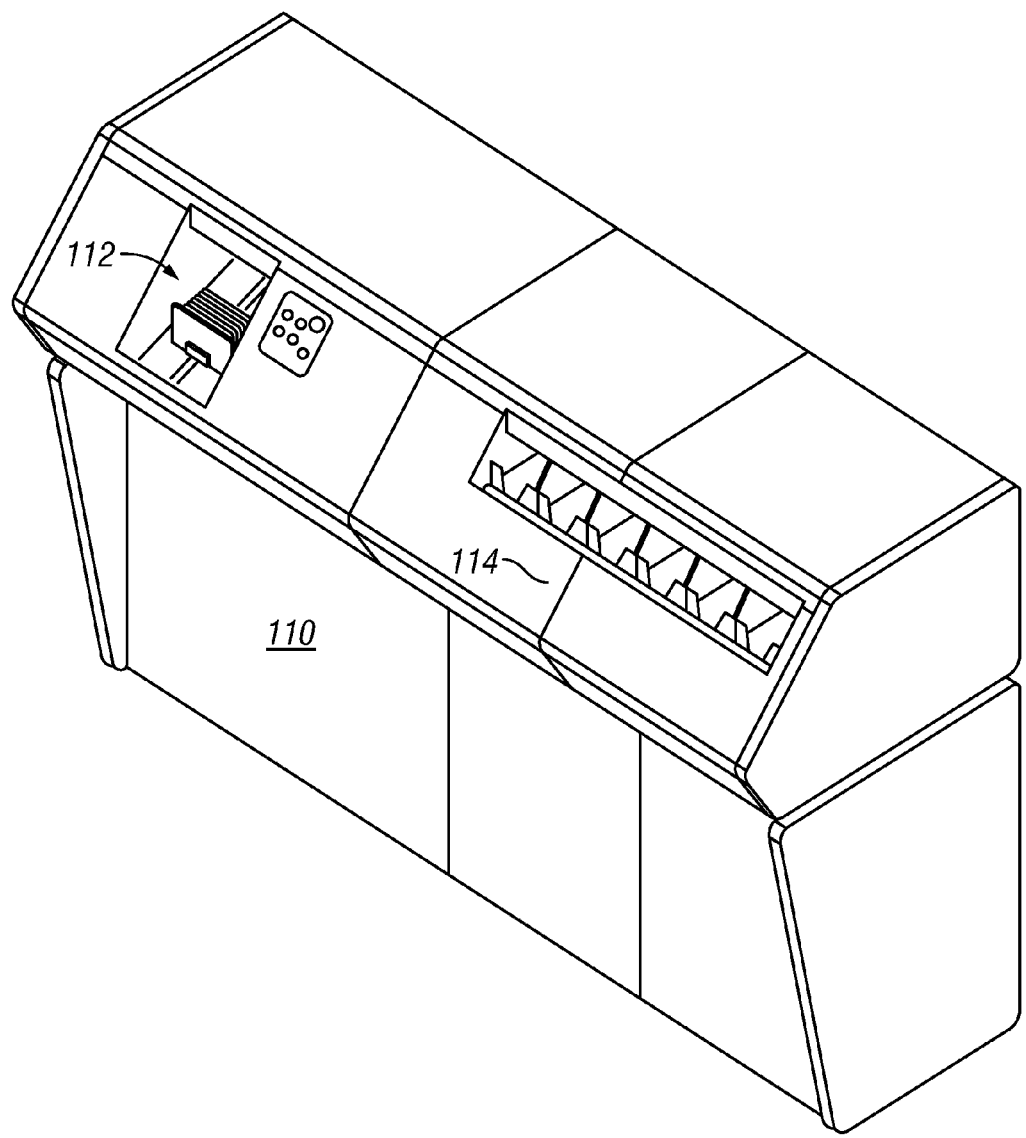
FIG. 3 shows a currency processing machine.

In one illustrative embodiment, the optically variable material detection system 10 may be used in conjunction with a currency processing machine 110, an example of which is shown in FIG. 3. The currency processing machine 110 may be loaded with a batch feed of currency 112 prior to starting the currency processing cycle. This batch feed of currency 112 may be fed into the currency processing machine one single note, or banknote, at a time. Single notes may then travel, on a conveyer past several different detectors before being deposited in one of the sort bins 114. A single sort bin may be used to accumulate a single denomination of note at the end of the sort process. It will be appreciated that the optically variable material detection system 10 may be used in conjunction with many other different types of machines, or none at all.

Figure 4:
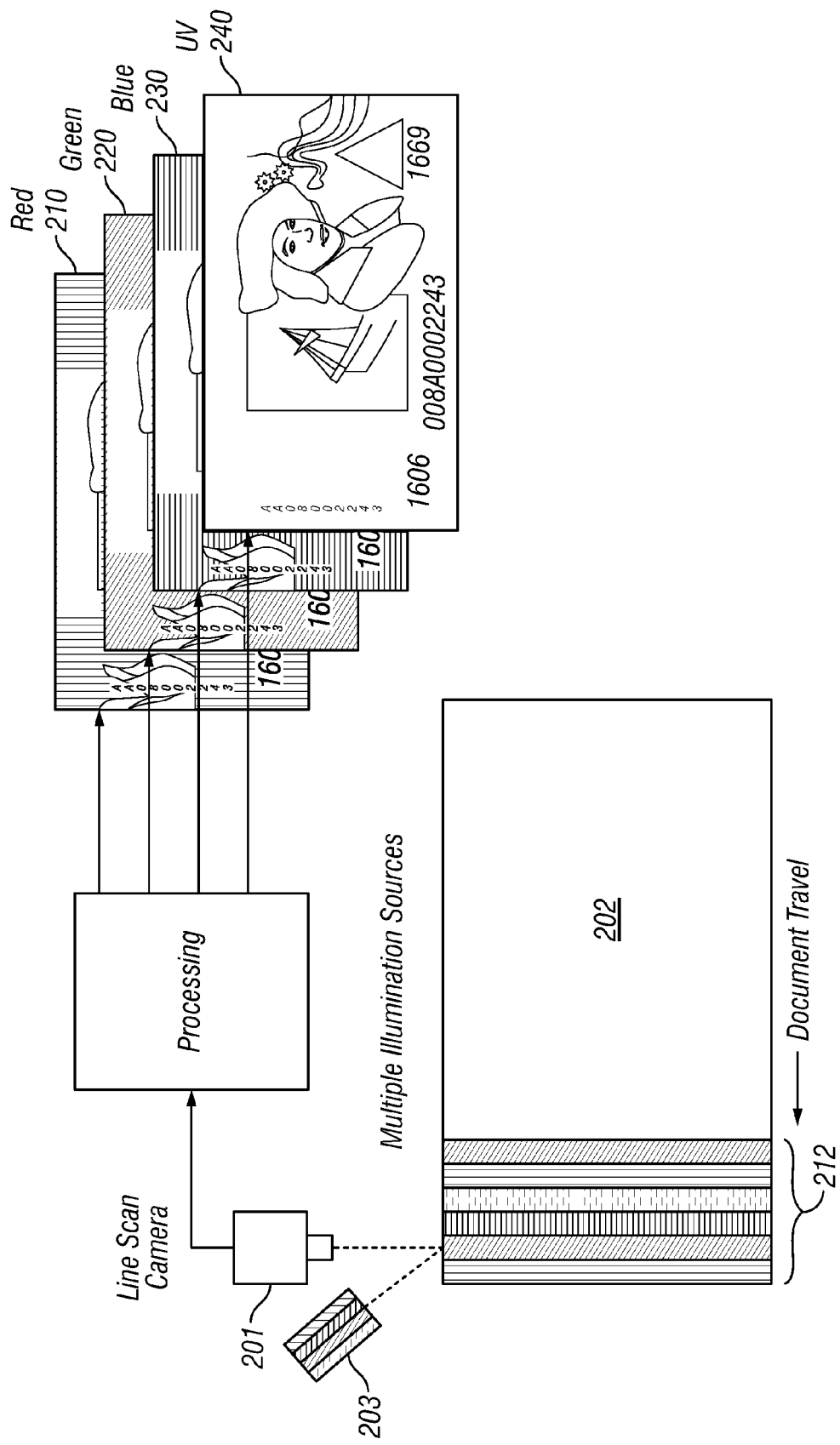
FIG. 4 illustrates the operation of sequenced illumination in bank note imaging in accordance with an illustrative embodiment.

FIG. 4 illustrates a non-limiting embodiment of the operation of sequenced illumination in bank note imaging. However, in other embodiments, sequenced illumination may not be used at all. For example, it will be appreciated that the illustrative embodiments are not limited to utilizing sequenced illumination as described in FIGS. 4-6 and 8-12. The illustrative embodiment of FIG. 4 may use a line scan camera 201 to capture an image of a note 202 as the note passes by in the direction indicated by the arrow. An electromagnetic radiation source or light source (light line) 203 may illuminate the passing note 202 using light emitting diodes (or similar light elements) that emit different wavelengths of light in a variable, sequential manner.

This sequenced illumination may produce an interleaved image in which each line of note 202 scanned by the line scan camera 201 is recorded under the illumination of a different wavelength of light in a pre-determined sequence (e.g., red, green, blue, UV, red, green, blue, UV, etc.) until the entire note 202 is scanned. FIG. 4 shows the interleaved pattern 212 superimposed on the note 202 to help illustrate this concept. In the present example, the interleaved image can be separated into red 210, green 220, blue 230, and ultraviolet (UV) 240 reflective images. The repeating RGBUV pattern used in FIG. 4 is only one of many examples of sequenced illumination that may be utilized.

In one embodiment, the light source 203 may use two different wavelengths. In another embodiment, four wavelengths are used. The illumination switching between the different colors may be synchronized with the image capture by the line scan camera 201 and may use a repeating pattern such as that described above (e.g., red, green, blue, UV, red, green, blue, UV, etc.) or a simpler or more complex pattern.

Figure 5:
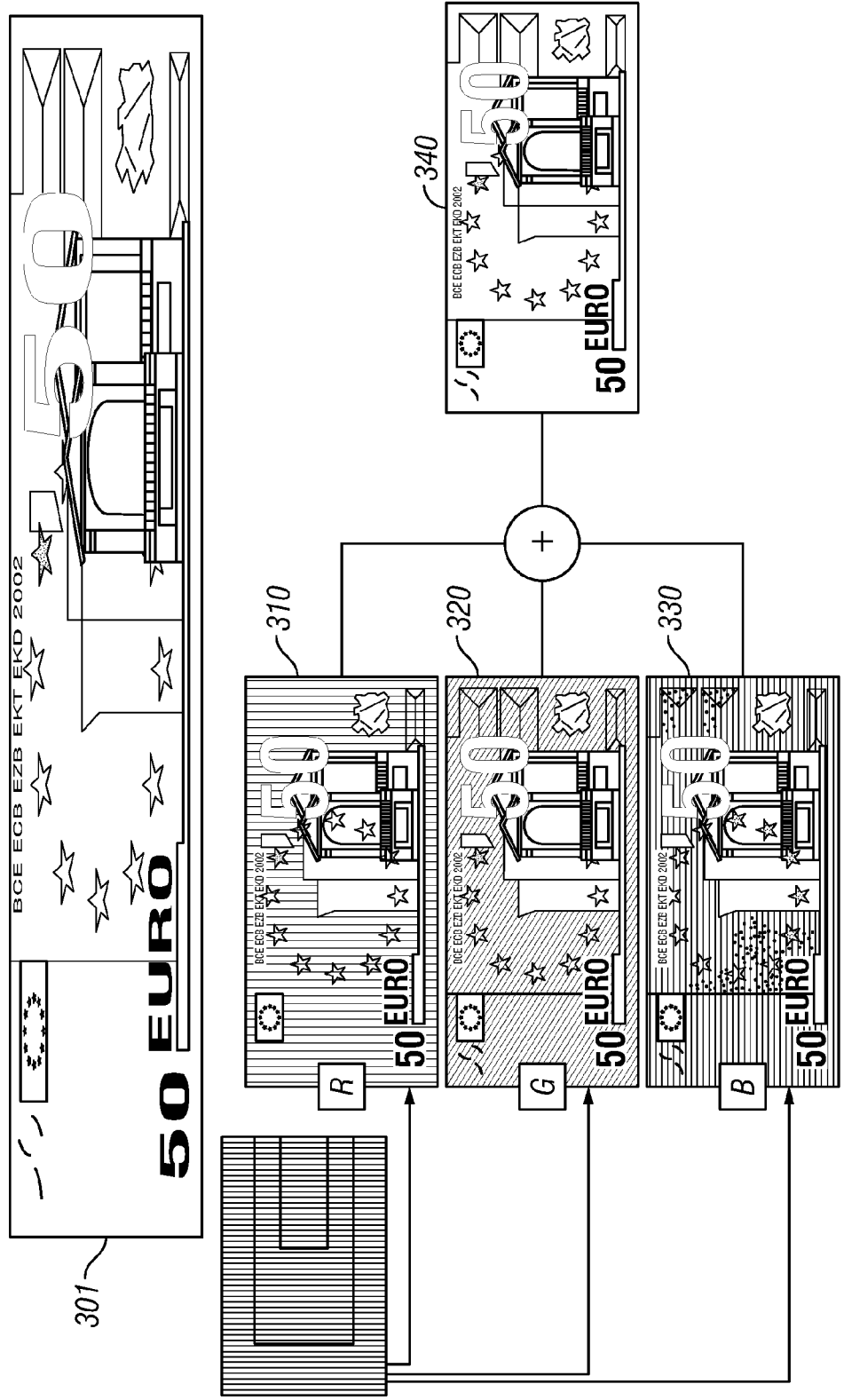
FIG. 5 shows an example of a raw interleaved image recorded by the line scan camera and its division into separate RGB images in accordance with an illustrative embodiment.

For illustrative embodiments using sequenced illumination, FIG. 5 shows a non-limiting example of a raw interleaved image 301 recorded by the line scan camera. This image may include all of the lines scanned under different wavelengths of light (e.g., RGB) combined together in sequence. The interleaved image 301 is elongated because the image is sampled at a higher rate than single reflectance white light illumination to preserve image resolution. Illustrated below the interleaved image 301 are the individual images 310, 320, 330 that result from separating the scan lines according to color (red, green and blue). In one embodiment, separate RGB images 310, 320, 330 may be combined into a single composite image 340 equivalent to white light illumination. The composite image may serve as the white light reflectance image against which the individual color reflectance images can be compared.

In one non-limiting embodiment, the images 310, 320, 330 are not color images; all of the scan lines, regardless of the color emitted by the light source, may be recorded by the same camera in greyscale. However, the reflection of light may differ according to the color of the light, which may be due to the way photons of different wavelengths interact with ink and surface features on the note (including soiling). As a consequence, in an illustrative embodiment, even, though the reflective images produced under different wavelengths of illumination are all recorded in greyscale, each image may reveal features not seen in the others, as shown in FIG. 5. In one non-limiting embodiment, the recording of the different wavelength images may occur at the same location by the same camera.

In addition to using different wavelengths of reflected light, an illustrative embodiment utilizing sequenced illumination may also alternate between reflective and transmissive illumination, as well as illumination from different, angles of incidence to the note (different azimuths).

Figure 6:
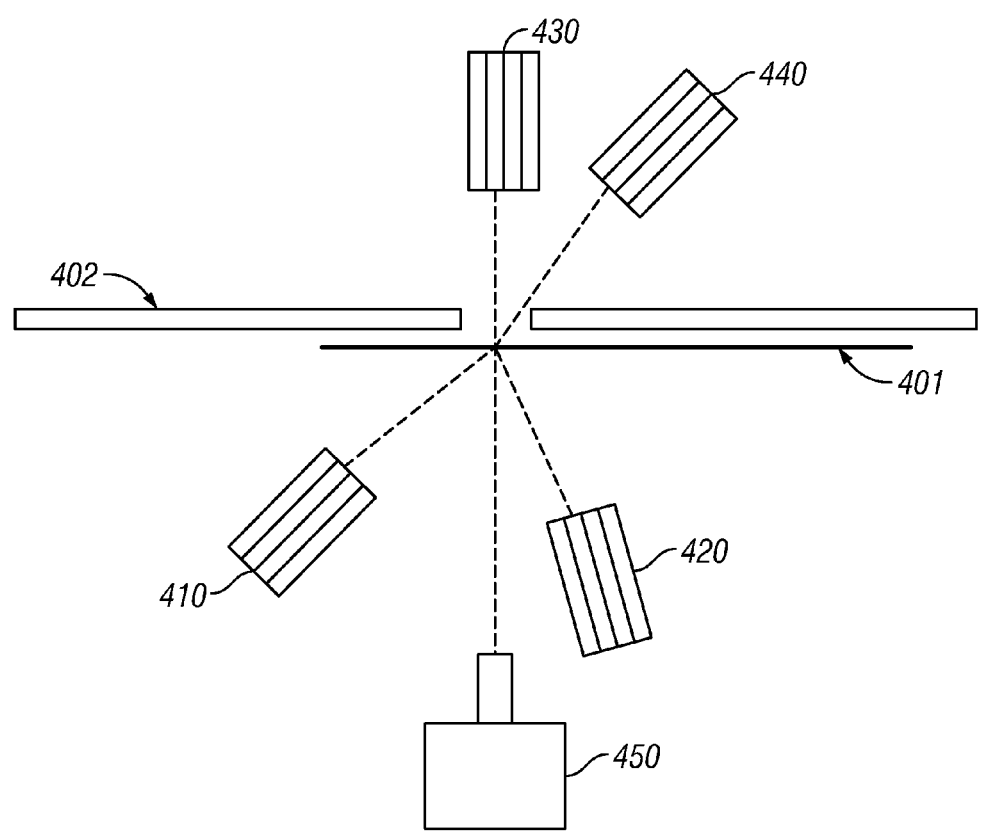
FIG. 6 shows an arrangement of light sources capable of implementing the different modes of sequenced illumination in accordance with an illustrative embodiment.

For a non-limiting embodiment utilizing sequenced illumination, FIG. 6 shows an example arrangement of light sources capable of implementing the different modes of sequenced illumination. Whereas the example shown in FIG. 4 may cover a multi-wavelength reflectance mode of sequential illumination, the configuration shown in FIG. 6 may also cover multi-azimuth and reflective/transmissive modes.

In this non-limiting embodiment, the currency note 401 may move along a straight note guide 402 in the currency processor. In some embodiments, the note guide 402 may be curved.

In one embodiment, light sources 410 and 420 may be used in the multi-azimuth mode of operation. Similar to the light source shown in FIG. 4, light sources 410 and 420 may each illuminate the passing note 401 using alternating wavelengths. Because light sources 410 and 420 are positioned at different azimuths relative to the note 401, the reflected image recorded by the line scan camera 450 may differ between the two azimuths if the note 401 includes features printed with an optically variable material, such as optically variable ink (OVI). Therefore, in one embodiment, in addition to interleaving different reflected wavelengths from the same light source (as shown in FIG. 4), reflective images produced by different azimuths of illumination may be interleaved. In yet another embodiment, the line scan camera 450 may capture one or more line images while either or both of the light sources 430 or 440 illuminate the note 401, and these line images may be included in an interleaved image of the note 401.

To illustrate one non-limiting embodiment of FIG. 6 utilizing sequenced illumination, the line scan camera 450 may capture a first plurality of line images of the note or document 401, and each of the first plurality of line images may be captured while at least a portion of the document 401 is subjected to one or more frequencies of electromagnetic radiation from a first angle of incidence (light source 410). The line scan camera 450 may also capture a second plurality of line images of the document 401, and each of the second plurality of line images may be captured while at least a portion of the document 401 is subjected to one or more frequencies of electromagnetic radiation from a second angle of incidence (light source 420). The first and second pluralities of line images that are captured by the line scan camera 450 may form an interleaved image of the document 401. The first and second angles of incidence may differ from one another.

A first color value for at least a portion of the document 401 may be determined using the first plurality of line images. Likewise, a second color value for at least a portion of the document 401 may be determined using the second plurality of languages. For example, all or a portion of either the first or second pluralities of line images may have an average or median hue or red/green ratio that may be used as a comparative color value. However, any color attribute that may be derived or determined based on the data in the first and second pluralities of line images may be compared with one another. It may be determined that an optically variable material is present on the document 401 if the first color value differs from the second color value.

The first and second pluralities of line images may be captured on a variety of ways. In one embodiment, the line scan camera 450 may capture a line image at a first portion of the document 401 in response to illuminating the first portion of the document 401 with a first color, or wavelength or frequency, of electromagnetic radiation from a first angle of incidence. Next, the line scan camera 450 may capture a line image at a second portion of the document 401 in response to illuminating the second portion of the document 401 with the first color, or wavelength or frequency, of electromagnetic radiation from a second angle of incidence. Next, the line scan camera 450 may capture a line image at a third portion of the document 401 in response to illuminating the third portion of the document 401 with a second color, or wavelength or frequency, of electromagnetic radiation from the first angle of incidence. Next, the line scan camera 450 may capture a line image at a fourth portion of the document 401 in response to illuminating the fourth portion of the document 401 with second color, or wavelength or frequency, of electromagnetic radiation from the second angle of incidence. Next, the line scan camera 450 may capture a line image at a fifth portion of the document 401 in response to illuminating the fifth portion of the document 401 with a third color, or wavelength or frequency, of electromagnetic radiation from the first angle of incidence. Next, the line scan camera 450 may capture a line image at a sixth portion of the document 401 in response to illuminating the sixth portion of the document 401 with the third color, or wavelength or frequency, of electromagnetic radiation from the second angle of incidence. The capturing of the line images as described in this embodiment may be repeated so that line images of the document 401 are captured for additional portions of the document 401 to form an interleaved image of the document 401. In one non-limiting example, each of the first, second, and third colors, or wavelengths or frequencies, may be one of red, green, or blue.

In an illustrative embodiment in which the illumination colors are red, green, and blue, capturing the first plurality of line images may include capturing a first subset of line images while at least a portion of the document 401 is subjected to red electromagnetic radiation from a first angle of incidence, capturing a second subset of line images while at least a portion of the document 401 is subjected to green electromagnetic radiation from the first angle of incidence, and capturing a third subset of line images while at least a portion of the document 401 is subjected to blue electromagnetic radiation from the first angle of incidence. In this non-limiting example, capturing the second plurality of line images may include capturing a fourth subset of line images while at least a portion, of the document 401 is subjected to red electromagnetic radiation from a second angle of incidence, capturing a fifth subset of line images while at least a portion of the document 401 is subjected to green electromagnetic radiation from the second angle of incidence, and capturing a sixth subset of line images while at least a portion of the document 401 is subjected to blue electromagnetic radiation from the second angle of incidence.

Color Shifting Elements (CSE) may produce different reflective colors (e.g., magenta and green) at different angles of incidence and reflection, including those cases in which the spectrum of illumination is the same for both angles (e.g., white light).

The multi-azimuth mode of sequenced illumination, in one non-limiting embodiment, may provide an effective means for detecting CSEs without the need for additional specialized equipment. The illustrative embodiments may also be used to evaluate the fitness of notes.

Figure 7B:
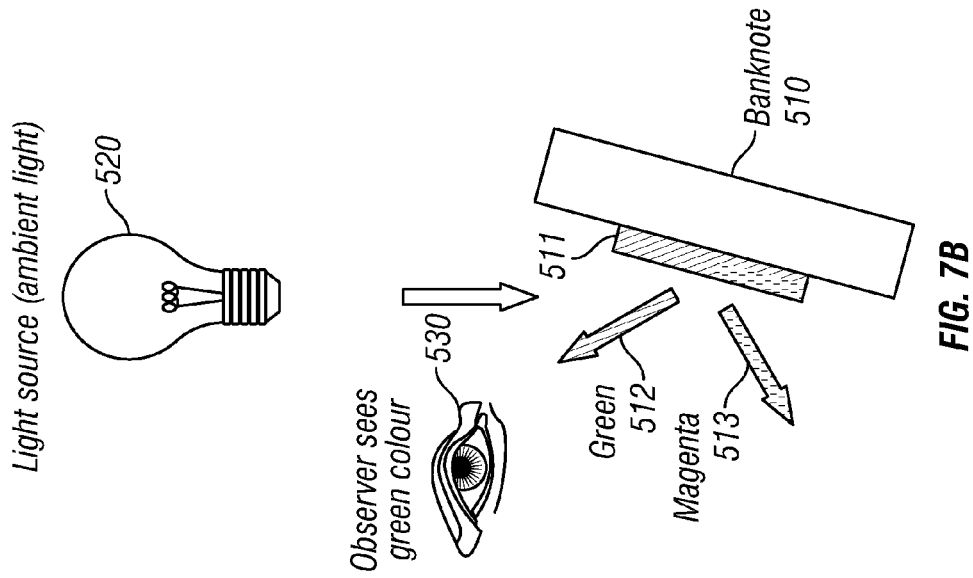
FIGS. 7A and 7B illustrate how the light color reflected by color shifting elements (CSE) may differ for the observer depending on the angle of incidence and reflectance.
Figure 7A:
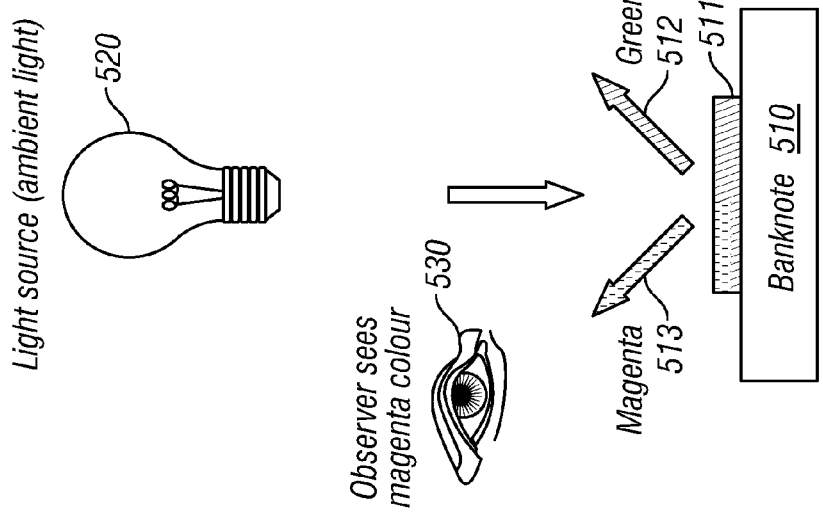

FIGS. 7A and 7B illustrate one example of how the light color reflected by CSEs differs for the observer depending on the angle of incidence and observation. In FIG. 7A, the incidence of illumination to the CSE 511 is approximately perpendicular, producing different reflective colors depending on the position of the observer 530 relative to the CSE. In the present example, the light reflected by the CSE is green in one direction 512 and magenta in the opposite direction 513, with the observer 530 seeing the magenta reflection as shown in the figure.

If the light source 520 and observer 530 are held in the same position relative to each other, one way for the observer in this example to see the green reflectance 512 is to change the angle of the bank not 510 and its CSE 511 relative to the light source and observer, as shown in FIG. 7B.

Figures 8, 9:
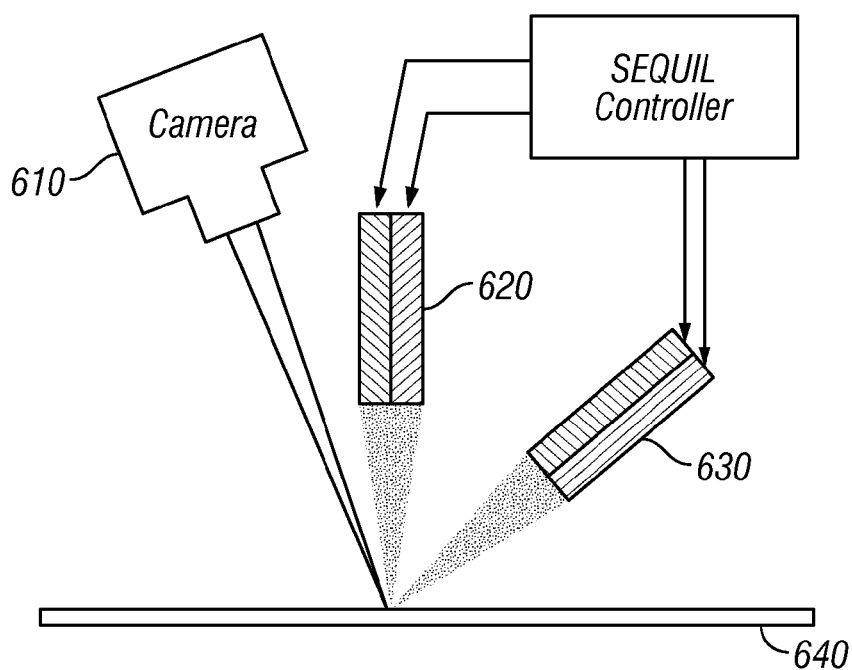
FIG. 8 shows an arrangement of light sources for implementing multi-azimuth sequenced illumination to detect optically variable materials in accordance with an illustrative embodiment.
FIG. 9 illustrates an example lookup table used to control sequenced illumination in accordance with an illustrative embodiment.

One non-limiting embodiment utilizing sequenced illumination may manipulate the angle of illumination and reflection while leaving the angle between the camera and the note constant. As shown in FIG. 8, the camera 610 may maintain a fixed viewing angle relative to the note 640. To detect the presence of the optically variable material, illumination may be provided by two light sources 620, 630 positioned at different azimuths relative to the note 640 and camera 610. In this example, the first light source 620 is approximately perpendicular to the note 640. The second light source 630 may be positioned at a much shallower angle. In one embodiment, the different angles of incidence and reflection of the light sources 620, 630 may produce different reflective colors from the optically variable material without having to change the angle of the camera 610.

In addition to alternating the azimuth of illumination, each of the light sources 620, 630 may have multiple LEDs, allowing each light source to illuminate the optically variable material with different colors in an interleaved pattern as described above.

A sequenced illumination, embodiment may allow the interleaving of the different reflective colors to produce a composite image of the optically variable material feature on the document. The images produced by the different reflective colors of the optically variable material may be recorded in grayscale, in one embodiment. However, the image of the optically variable material may be slightly different for each reflected wavelength.

Optically variable materials, including CSEs, may reflect any number of different wavelengths (e.g., one, two, three, five, etc.). For example, optically variable materials may reflect three or more different colors at different angles of incidence and reflection. Applying this option to an illustrative embodiment would allow for a separate light source at each azimuth of illumination corresponding to each reflected color. Thus, any number of light sources may be used in the illustrative embodiments.

The wavelengths reflected by optically variable materials may or may not be in the visible range. Optically variable materials, including CSEs, may be used as public security features that are overt and easily recognizable by members of the general public upon visual inspection. However, the illustrative embodiments also allow for the introduction of covert optically variable materials that shift between non-visible wavelengths of light. For example, a currency note may include a optically variable material, that shifts between different. IR wavelengths.

FIG. 9 illustrates an example lookup table that may be used to control sequenced illumination in accordance with a sequenced illumination embodiment. The lookup table 700 may be stored in the memory of the control system. There may be a separate memory address for each line of the image recorded by the camera, represented by the rows in the table. Each column may represent a different source of illumination, which may include all of the LEDs on an of the light lines in the machine.

The non-limiting example of a lookup table shown in FIG. 9 includes five image scan lines and four illumination sources. In this example, the illumination sources may be the different color LEDs present in one light line, which, in this case, are red, green, blue and infrared (IR). The number at the intersection of each row and column may be a control byte applied to each LED array during the recording of that image line. The control bytes may determine the intensity of illumination produced by the LED in question. In the present example, a value of 255 may represents full intensity, while a value of 0 may represent "off". In one embodiment, the control system might employ a value of 128, which may represent half intensity.

Applying this example lookup table to an illustrative embodiment of the sequential illumination of a note, scan line 1 would be illuminated by red light, while the remaining LEDs remain off. For line 2, only the green LED is lit. Similarly, only the blue LED is lit for line 3, and only the IR LED is lit for line 4. For line 5, the red, green and blue LEDs are all lit at full intensity while the IR LED is off, thereby producing a white light reflectance.

Figure 10:
FIG. 10 shows an example lookup table used to control multi-azimuth sequenced illumination for optically variable material detection in accordance with an illustrative embodiment.

FIG. 10 shows another example of a lookup table that may be used to control an illustrative embodiment of multi-azimuth sequenced illumination for optically variable material detection. The table 800 in FIG. 10 illustrates one possible control sequence for producing a six-way interleaved image using two light sources positioned at different azimuths relative to the note. In one embodiment, parameters such as line number, light source, azimuth, electromagnetic radiation frequency, etc. may be varied by using different values, elements, and rows/columns in a lookup table.

The illumination sequence shown in FIG. 10 may maintain an RGB sequence but alternate between the light sources for each color, thereby interleaving the high azimuth RGB sequence with the low azimuth RGB sequence. In one example, the first scan line imaged by the camera, is under red illumination provided by the light source at azimuth 1. The second scan line is also imaged under red illumination but this time from the light source at azimuth 2. The sequence then returns to azimuth 1 and now uses green illumination for scan line 3, and so on. The process may continue back and forth alternating between the first and second azimuths for each color before moving to the next color, until the specified number of scan lines is imaged. In the present example, six scan lines are shown in order to illustrate a complete RGB sequence for both azimuths, but the actual number of scan lines imaged may depend, e.g., on the size of the optically variable material in question.

Figure 11:
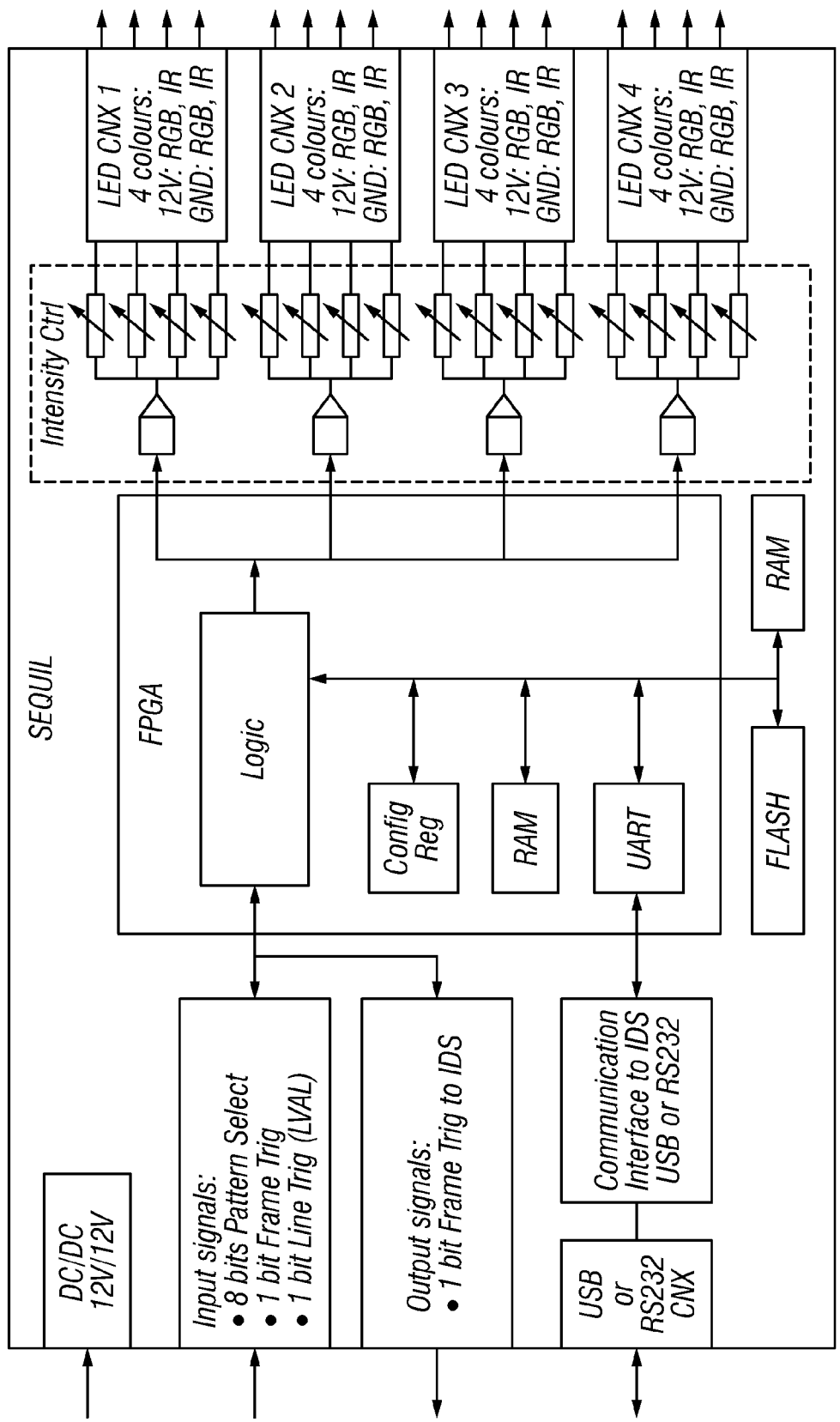
FIG. 11 is a block diagram of the control system that may be used for sequenced illumination in accordance with an illustrative embodiment.

FIG. 11 is an illustrative example of a control system that may be used in, e.g. a sequenced illumination embodiment.

Figure 12:
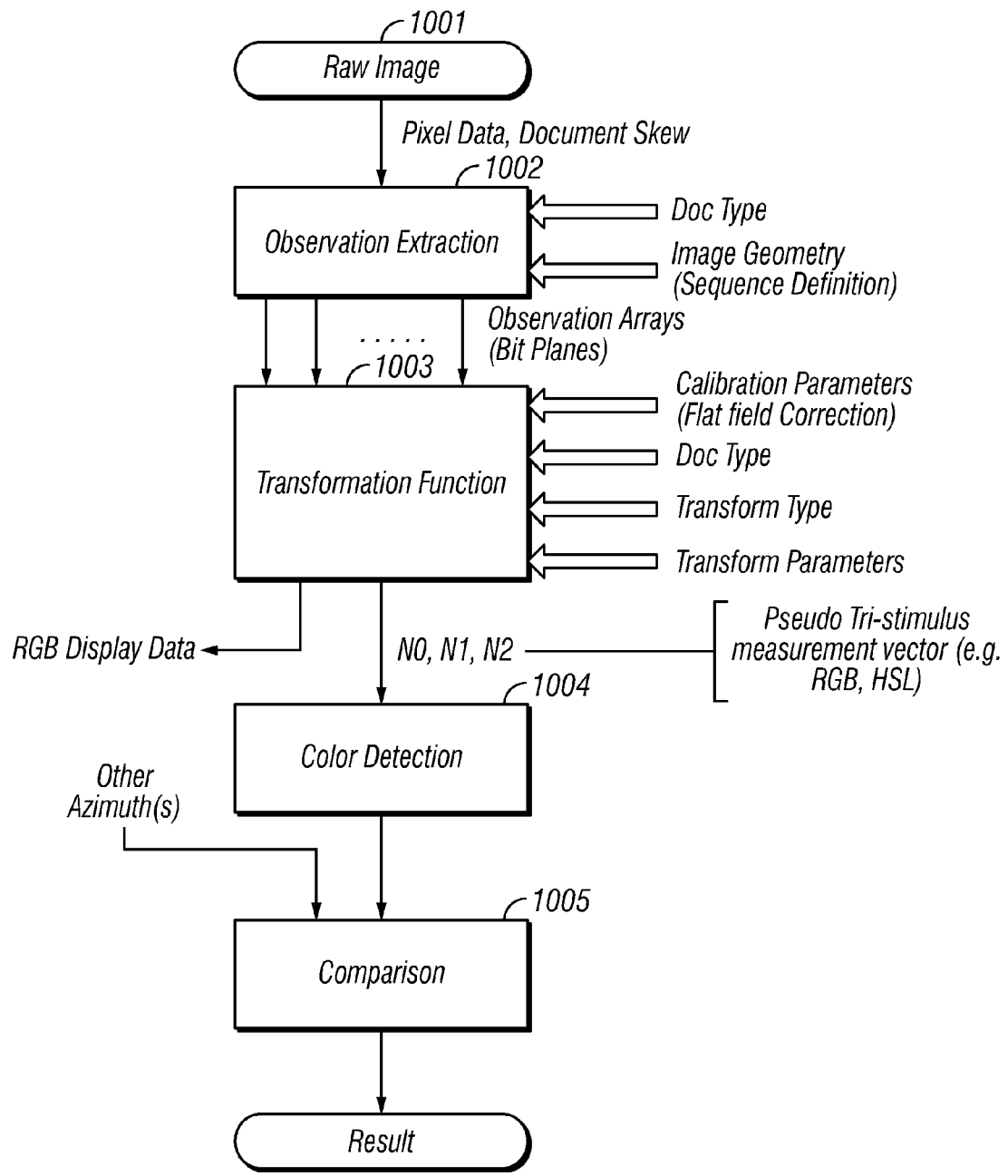
FIG. 12 is a flowchart that illustrates an overall process of applying sequenced illumination to a flowchart, of a process for detecting an optically variable material according to an illustrative embodiment.

FIG. 12 is a flowchart that illustrates a non-limiting embodiment of an overall process of applying sequenced illumination to detect optically variable material. The process may begin with the acquisition of raw data (step 1001). This may involve the capture of an interleaved image.

Once the raw image is acquired, the next step may be observation extraction (step 1002). This process may include extracting a multi-dimensional observation from the raw data based on the known document type: specific currency (e.g., US dollar or Euro), denomination and series (e.g., 1996 US twenty dollar bill), and specific orientation presented to the camera (e.g., front face left edge leading). Observation extraction may also be based on the image geometry, which may describe the illumination sequence (mode) that was used to acquire the raw data for this note type, as well as the known location and rotation of the document within the acquired image frame (document skew).

Following observation extraction, the process may apply a Transformation Function to the data (step 1003). This is a mathematical transformation function that may convert the multi-dimensional observation data into a three-dimensional vector. This transformation process may be any linear or non-linear combination of the observation data. For example, the observation data may be a two-dimensional array corresponding to a certain rectangular region of the note, wherein each point in the two-dimensional array is a three-dimensional value containing a red, green, and blue reflectance value. The Transformation Function may convert this into a single three-dimensional measurement that contains a mean hue, saturation, and luminance value for the entire rectangular region. For example, when detecting optically variable material, the transform may produce a hue value from the RGB values. Alternatively, the transform may produce an R/G ratio. Other methods may be used to determine the color reflected by the surface of the note.

From the Transformation Function, the process may determine the detected color from or for the azimuth in question (step 1004). Steps 1003 and 1004 may be performed in parallel for each azimuth of illumination. In other embodiments, attributes other than color may be determined, such as the position or brightness of elements on the note.

After the process determines the reflected color in step 1004, it may then compare this to the color detected from the other azimuth(s) (step 1005). If there is indeed an optically variable material present on the image region of the note the comparison in step 1005 may reveal a difference in the values between the azimuths, e.g., hue values or R/G ratios.

The example methods of sequential illumination described above are not limited to use with currency notes. They can also be applied to any other type of document.

Figure 13:
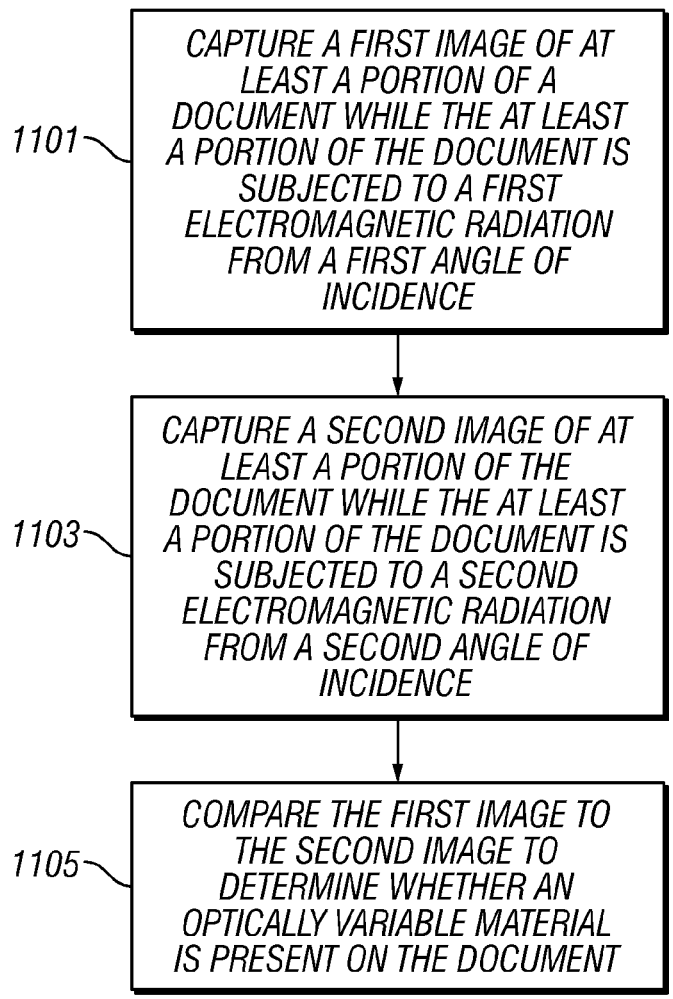

Referring to FIG. 13, an illustrative embodiment of a process for detecting optically variable material includes capturing a first image of at least a portion of a document while the a portion of the document is subjected to a first electromagnetic radiation from a first angle of incidence (step 1101). The process also includes capturing a second image of at least a portion of the document while the portion of the document is subjected to a second electromagnetic radiation from a second angle of incidence (step 1103). In another example, an image of the entire document may be captured in each of the first and second images. The process may compare the first image to the second image to determine whether an optically variable material is present on the document (step 1105).

Figure 14:
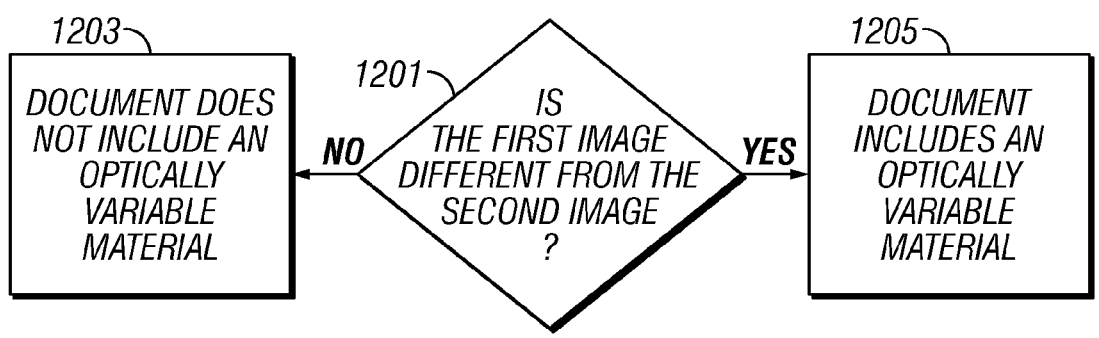
FIG. 14 is a flowchart of a process for comparing the first image to the second image, as illustrated in FIG. 13, according to an illustrative embodiment.

Referring to FIG. 14, an illustrative embodiment of a process for comparing the first image to the second image, as shown in step 1105 of FIG. 13, includes determining whether the first image is different from the second image (step 1201). If the process determines that the first image is not different from the second image, the process determines that the document does not include an optically variable material (step 1203). Returning to step 1201, if the process determines that the first image does differ from the second image, the process determines that the document includes an optically variable material (step 1205).

Figure 15:
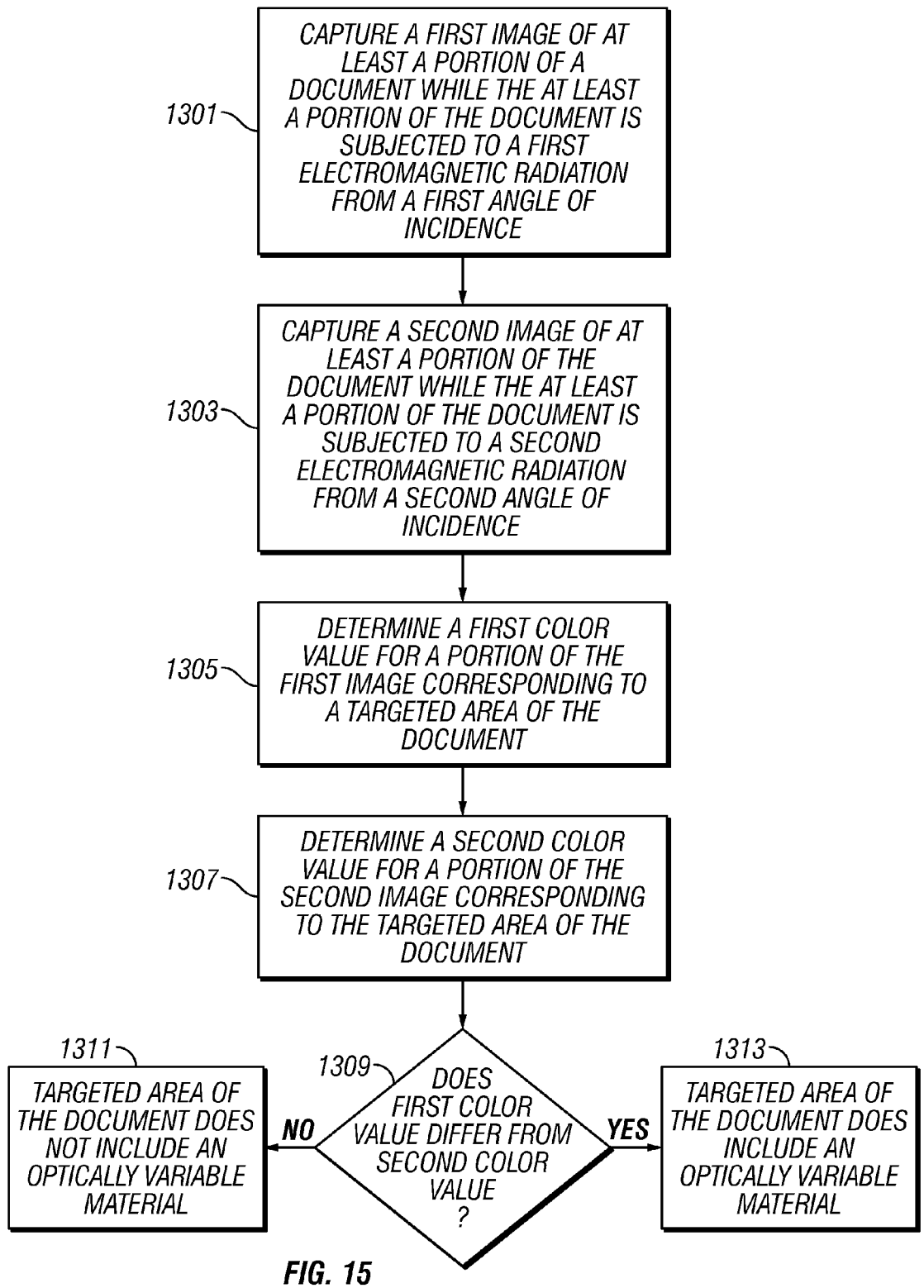
FIG. 15 is a flowchart of a process for detecting an optically variable material according to another illustrative embodiment.

Referring to FIG. 15, an illustrative embodiment of a process for detecting an optically variable material includes capturing a first image of at least a portion of a document while the portion of the document is subjected to a first electromagnetic radiation from a first angle of incidence (step 1301). The process also captures a second image of at least a portion of the document while the portion of the document is subjected to a second electromagnetic radiation from a second angle of incidence (step 1303). In another example, an image of the entire document may be captured in each of the first and second images. The process may determine a first color value for a portion of the first image corresponding to a targeted area of the document (step 1305). The targeted area may be selected or predetermined in any manner. In one embodiment, the area at which an optically variable material is likely to be located for a particular document may be known, and the targeted area may therefore be predetermined prior to step 1305. The targeted area may also be dynamically selected. The process may also determine a second color value for a portion of the second image corresponding to the targeted area of the document (step 1307).

The process may also include determining whether the first color value differs from the second color value (step 1309). If the process determines that the first color value does not differ from the second color value, the process may determine that the targeted area of the document does not include an optically variable material (step 1311). Returning to step 1309, if the process determines that the first color value differs from the second color value, the process determines that the targeted area of the document does include an optically variable material (step 1313).

Figure 16:
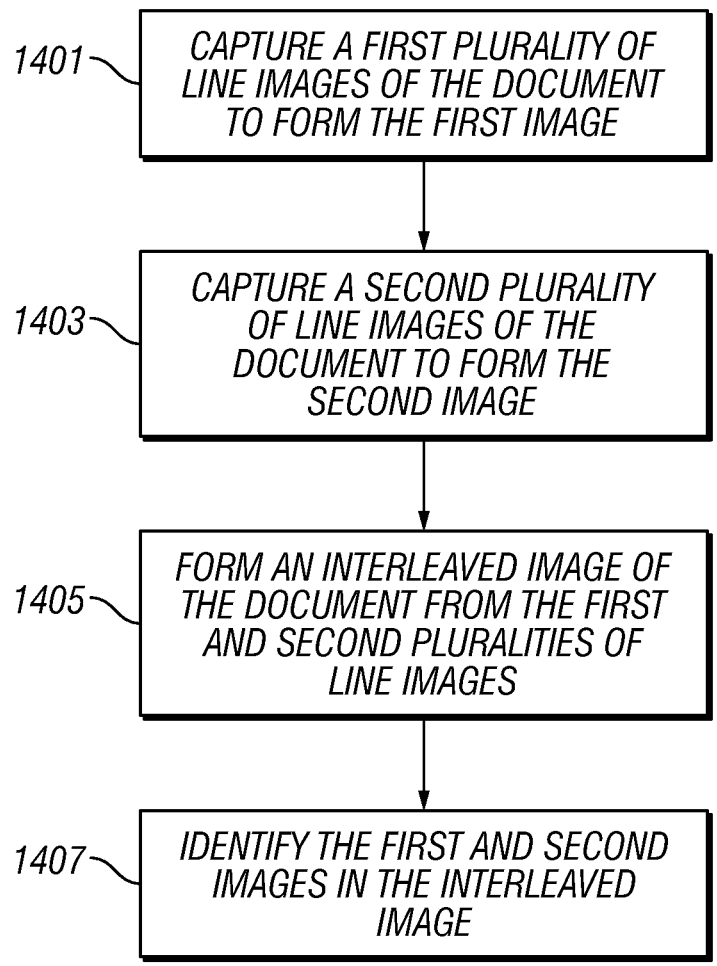
FIG. 16 is a flowchart of a process for capturing the first and second images, as illustrated in FIG. 15, according to an illustrative embodiment.

Referring to FIG. 16, an illustrative embodiment of a process for capturing the first and second images, as illustrated in steps 1301 and 1303 in FIG. 15, includes capturing a first plurality of line images of the document to form the first image (step 1401). The process may also capture a second plurality of line images of the document to form the second image (step 1403). The process forms an interleaved image of the document from the first and second pluralities of line images (step 1405). The process may identify the first and second images in the interleaved image (step 1407).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. It will be appreciated that any feature that is described in a connection to any one embodiment may also be applicable to any other embodiment.

What is claimed is:

1. A method for detecting an optically variable material, the method comprising:
    capturing a first image of at least a portion of a document while the at least a portion of the document is subjected to a first electromagnetic radiation from a first angle of incidence;
    capturing a second image of at least a portion of the document while the at least a portion of the document is subjected to a second electromagnetic radiation from a second angle of incidence, the first angle of incidence different from the second angle of incidence, the first and second images captured by an imaging device that has a substantially fixed position; and
    comparing the first image to the second image to determine whether an optically variable material is present on the document.

2. The method of claim 1, wherein comparing the first image to the second image comprises determining whether the optically variable material is present on the document based on whether the first image is different from the second image.

3. The method of claim 1, wherein capturing the first image of the at least a portion of the document comprises capturing the first image of the at least a portion of the document while the at least a portion, of the document is non-simultaneously subjected to two or more frequencies of electromagnetic radiation from the first angle of incidence; and
    wherein capturing the second image of the at least a portion of the document comprises capturing the second image of the at least a portion of the document while the at least a portion of the document is non-simultaneously subjected to two or more frequencies of electromagnetic radiation from the second angle of incidence.

4. The method of claim 3, wherein, the two or more frequencies of electromagnetic radiation comprise two or more of the following frequencies of electromagnetic radiation: (1) a frequency in a range of 400-484 Terahertz, (2) a frequency in a range of 526-606 Terahertz, or (3) a frequency in a range of 631-668 Terahertz.

5. The method of claim 1, further comprising:
    determining a first color value for at least a portion of the first image; and
    determining a second color value for at least a portion of the second image;
    wherein comparing the first image to the second image to determine whether the optically variable material is present on the document comprises determining whether the first color value differs from the second color value.

6. The method of claim 5, wherein determining the first color value for the at least a portion of the first image comprises determining the first color value for a portion of the first image corresponding to a targeted area of the document;
    wherein determining the second color value for the at least a portion of the second image comprises determining the second color value for a portion of the second image corresponding to the targeted area of the document; and
    determining that the optically variable material is present on the targeted area of the document if the first color value differs from the second color value.

7. The method of claim 5, wherein the first, and second color values are at least one of a hue value or red/green ratio.

8. The method of claim 1, wherein the optically variable material is a hologram.

9. The method of claim 1, wherein the imaging device is a line scan camera;
    wherein capturing the first image of the at least a portion of the document, comprises capturing a first plurality of line images of the document to form the first image; and
    wherein capturing the second image of the at least a portion of the document comprises capturing a second plurality of line images of the document to form the second image.

10. The method of claim 9, wherein the first and second pluralities of line images are arranged in a predetermined sequence to form an interleaved image of the document, the interleaved image comprising the first image and the second image.

11. The method of claim 1, wherein a frequency of the first electromagnetic radiation is substantially the same as a frequency of the second electromagnetic radiation.

12. The method of claim 1, wherein the imaging device capturing the first and second images is a single camera having a substantially fixed position.

13. A method for detecting an optically variable material, the method comprising:
    capturing a first plurality of line images of a document, each of the first plurality of line images captured while at least a portion of the document is subjected to one or more frequencies of electromagnetic radiation from a first angle of incidence;
    capturing a second plurality of line images of the document, each of the second plurality of line images captured while at least a portion of the document is subjected to one or more frequencies of electromagnetic radiation from a second angle of incidence, the first angle of incidence different from the second angle of incidence;

determining a first color value for at least a portion of the document using the first plurality of line images;

determining a second color value for at least a portion of the document using the second plurality of line images;

determining whether the first color value differs from the second color value; and determining that an optically variable material is present on the document in response to the first color value differing from the second color value.

14. The method of claim 13, wherein capturing the first and second pluralities of line images comprises:
   (a) capturing a line image at a first portion of the document in response to illuminating the first portion of the document with a first frequency of electromagnetic radiation from the first angle of incidence;
   (b) capturing a line image at a second portion of the document in response to illuminating the second portion of the document with the first frequency of electromagnetic radiation from the second angle of incidence;
   (c) capturing a line image at a third portion of the document in response to illuminating the third portion of the document with a second frequency of electromagnetic radiation from the first angle of incidence;
   (d) capturing a line image at a fourth portion of the document in response to illuminating the fourth portion of the document with the second frequency of electromagnetic radiation from the second angle of incidence;
   (e) capturing a line image at a fifth portion of the document in response to illuminating the fifth portion of the document with a third frequency of electromagnetic radiation from the first angle of incidence;
   (f) capturing a line image at a sixth portion of the document in response to illuminating the sixth portion of the document with the third frequency of electromagnetic radiation from the second angle of incidence; and
   (g) repeating steps (a) through (f) so that line images of the document are captured for additional portions of the document to form an interleaved image of the document.

15. The method of claim 14, wherein each of the first, second, and third frequencies of electromagnetic radiation are one of red, green, or blue light.

16. The method of claim 13, wherein capturing the first and second pluralities of line images comprises capturing the first and second pluralities of line images to form an interleaved image of the document.

17. The method of claim 13, wherein capturing the first plurality of line images of the document comprises:

capturing a first subset of line images while at least a portion of the document is subjected to red electromagnetic radiation from the first angle of incidence;

capturing a second subset of line images while at least a portion of the document is subjected to green electromagnetic radiation from the first angle of incidence; and capturing a third subset of line images while at least a portion of the document is subjected to blue electromagnetic radiation from the first angle of incidence;

wherein capturing the second plurality of line images of the document comprises:

capturing a fourth subset of line images while at least a portion of the document is subjected to red electromagnetic radiation from the second angle of incidence;

capturing a fifth subset of line images while at least a portion of the document is subjected to green electromagnetic radiation from the second angle of incidence; and capturing a sixth subset of line images while at least a portion of the document is subjected to blue electromagnetic radiation from the second angle of incidence.

18. An apparatus for detecting an optically variable material, the apparatus comprising:

a first electromagnetic radiation source to emit a first electromagnetic radiation toward a document at a first angle of incidence;

a second electromagnetic radiation source to emit a second electromagnetic radiation toward the document at a second angle of incidence, the first angle of incidence different from the second angle of incidence;

an imaging device to capture a first image and a second image of the document, each of the first image and the second image being captured while electromagnetic radiation from at least one of the first electromagnetic radiation source or the second electromagnetic radiation source is emitted toward the document; and a controller to determine whether an optically variable material is present on the document based on a difference between the first image and the second image.

19. The apparatus of claim 18, wherein the imaging device is a single camera at a substantially fixed position, the imaging device capturing the first and second images from a third angle of incidence, the third angle of incidence differing from the first and second angles of incidence.

20. The apparatus of claim 18, wherein each of the first and second electromagnetic radiation sources are adapted to emit electromagnetic radiation at two or more frequencies.

* * * * *